US006781268B2

(12) United States Patent
Oku (10) Patent No.: US 6,781,268 B2
(45) Date of Patent: Aug. 24, 2004

(54) SPINDLE MOTOR, AND DISK DRIVE UTILIZING THE SPINDLE MOTOR

(75) Inventor: Yoshito Oku, Yasu-Gun (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 10/249,538

(22) Filed: Apr. 17, 2003

(65) Prior Publication Data

US 2003/0197438 A1 Oct. 23, 2003

(30) Foreign Application Priority Data

Apr. 18, 2002 (JP) .................................. 2002-115655

(51) Int. Cl.[7] .............................................. H02K 5/16
(52) U.S. Cl. ...................................... 310/90; 384/132
(58) Field of Search ...................... 310/90, 90.5, 67 R; 384/132, 100, 107

(56) References Cited

U.S. PATENT DOCUMENTS

| 4,998,033 | A |   | 3/1991 | Hisabe et al. ............. 310/67 R |
|-----------|---|---|--------|-------------------------------------|
| 5,142,173 | A |   | 8/1992 | Konno et al. ............. 310/67 R |
| 5,223,758 | A |   | 6/1993 | Kataoka et al. ............... 310/90 |
| 5,325,006 | A | * | 6/1994 | Uno et al. .................... 310/90 |
| 5,423,612 | A | * | 6/1995 | Zang et al. .................. 384/119 |
| 5,457,588 | A |   | 10/1995 | Hattori et al. ........... 360/99.08 |
| 5,659,445 | A |   | 8/1997 | Yoshida et al. .......... 360/98.07 |
| 5,751,085 | A | * | 5/1998 | Hayashi ......................... 310/90 |
| 5,876,124 | A |   | 3/1999 | Zang et al. .................. 384/107 |
| 6,066,903 | A | * | 5/2000 | Ichiyama ...................... 310/90 |
| 6,339,270 | B1| * | 1/2002 | Ichiyama .................. 310/67 R |

FOREIGN PATENT DOCUMENTS

JP        2000-197307 A    7/2000

* cited by examiner

*Primary Examiner*—Dang Le
(74) *Attorney, Agent, or Firm*—James Judge (57) ABSTRACT

Oil-retaining configuration in partially filled or fully filled dynamic-pressure bearing system for miniaturized, low-profile spindle motor. A radial bearing section and a magnetically balanced thrust bearing section compose the bearing system. An oil taper seal is configured in between the rotor and the sleeve, radially beyond the radial bearing section, and not axially beyond the thrust bearing section. The taper-seal gap slopes radially inward, flaring with further separation from the rotor undersurface, in a configuration that lengthens the tapered space functioning as, and enlarges the capacity within, the taper-seal area, and that sets up the oil boundary surface oriented sloping radially inward. Centrifugal force during rotation thus acts pressing in on the oil boundary surface, fortifying the sealing strength. The oil-retaining configuration allows for span, between twin constituents provided as the radial bearing section, sufficient for increased conical stiffness even in a reduced-profile structure.

17 Claims, 7 Drawing Sheets

SPINDLE MOTOR, AND DISK DRIVE UTILIZING THE SPINDLE MOTOR

BACKGROUND OF INVENTION

1. Technical Field

The present invention relates to spindle motors equipped with dynamic-pressure bearings, and to disk drive devices in which such spindle motors are employed. The invention relates in particular to miniature, low-profile, high-rpm spindle motors, and to disk-drive devices that drive at high speed data-recording disks 2.5 inches and under in outside diameter.

2. Description of the Related Art

Dynamic-pressure bearings are employed as spindle-motor bearings in hard-disk and other data-recording disk-drive devices. The bearings exploit the fluid pressure of a lubricating fluid such as oil interposed in between the shaft and the sleeve, in order to support the two letting the one rotate against the other.

Figure 1:
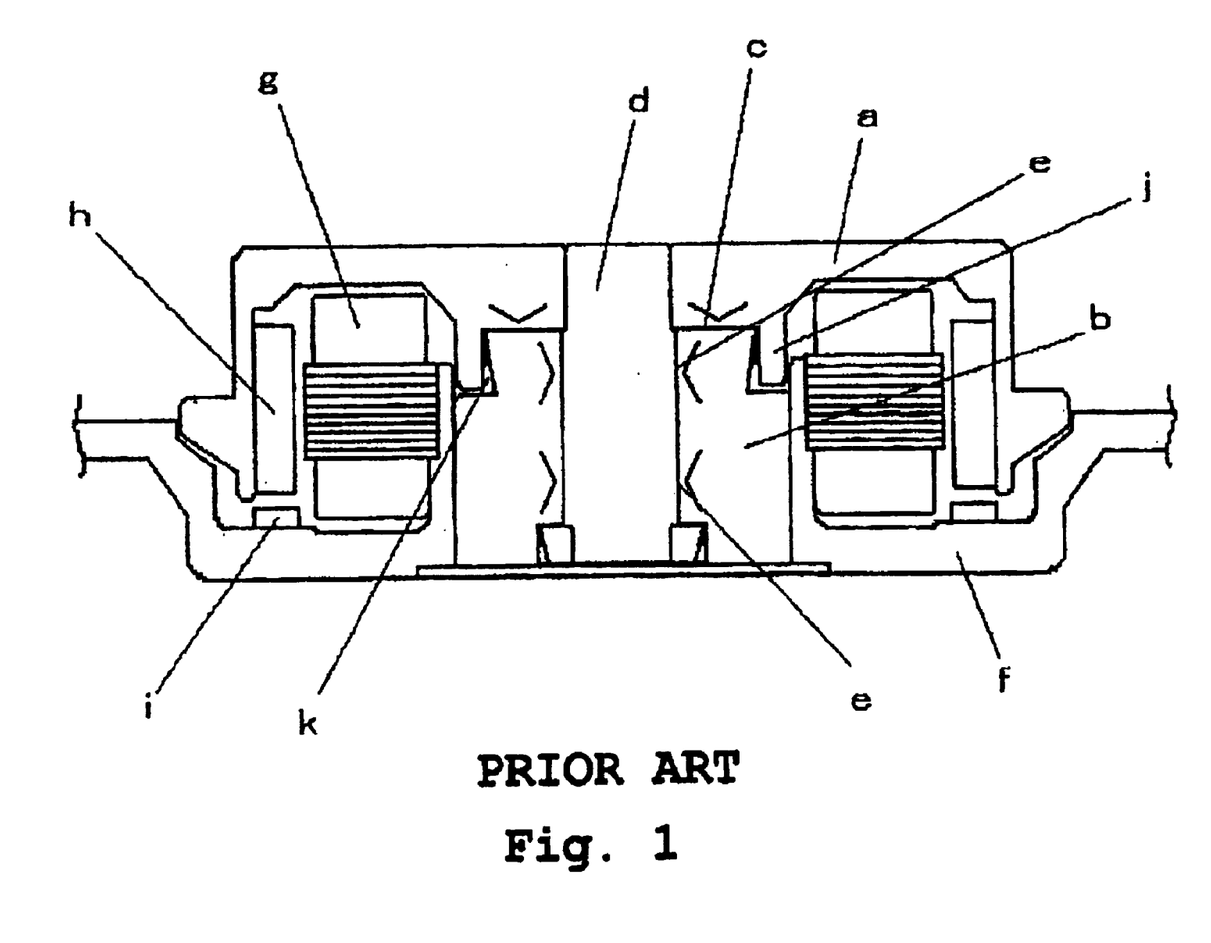
FIG. 1 is a section view diagramming the configurational outline of a conventional spindle motor.

A conventional spindle motor employing dynamic-pressure bearings of this sort is illustrated in FIG. 1. The spindle motor diagrammed in FIG. 1 is configured with a thrust bearing section c in between the undersurface of the rotor a and the upper-end face of the sleeve b, for causing lift on the rotor a, and is also configured with radial bearing sections e, e, in between the outer circumferential surface of the shaft d, which is furnished unitarily with the rotor a, and the inner circumferential surface of the sleeve b, for centering the rotor a and preventing the rotor a from rotating at a tilt. In addition, the stator g is fitted to a base member f into which the sleeve b is fixed, and meanwhile a rotor magnet h is mounted on the rotor a so as be opposite the stator 9.

In a conventional spindle motor of this sort, when the spindle motor is rotating the rotor a is lifted by the thrust bearing c configured between the undersurface of the rotor a and the upper-end face of the sleeve b; yet by virtue of a ring member i manufactured of a ferromagnetic material being disposed in a location on the base member f that axially opposes the rotor magnet h, the lifting force due to the dynamic pressure in the thrust bearing section c and the magnetic attraction acting in between the rotor magnets h and the ring member i are brought into a balance that supports axial loads put on the rotor a. This means that a thrust plate that would be installed on the end portion of the shaft in order to configure, together with the sleeve and a counter plate, another thrust bearing section is not adopted in the spindle motor illustrated in FIG. 1.

Consequent advantages to the spindle motor depicted in FIG. 1 are that it is made simple and low-cost with no appreciable degradation in bearing stiffness, and that the motor can be made thinner in profile. Nevertheless, as far as disk drives in which a spindle motor of this kind is employed are concerned, owing to gains in the amount of data that can be stored on data-recording disks and owing to shortened seek times, even faster rpm has been demanded from a spindle motor for driving such data-recording disks.

In spindle motors illustrated in FIG. 1 noted above, an axially oriented taper-seal area k as a means of preventing oil retained in the thrust bearing c from leaking out to the bearing exterior has been formed in between the outer periphery of the sleeve b and the inner peripheral surface of an annular projection j provided on the undersurface of the rotor a; and the oil has been sealed in the taper-seal area k by the internal pressure of the oil being balanced with atmospheric pressure to form meniscus.

Inasmuch as the gap formed within the taper-seal area k broadens heading in the direction parting from the bearing section, the capillary force varies according to the position where the meniscus forms. Consequently, in a situation in which the amount of oil retained in the bearing section has decreased, oil will be supplied to the bearing section from the taper-seal area k; conversely, in a situation in which the volume of oil retained in the bearing section has increased on account of temperature elevation or another cause, the increase in oil will be accommodated within the taper-seal area k.

With the taper-seal area k in the spindle motor depicted in FIG. 1 being disposed to the outer periphery of the radial bearing sections e, e, the taper-seal area k is not configured ranged in the axial direction beyond the bearing sections, which are the thrust bearing section c and the radial bearing sections e, e. This means that the spindle motor may be made still thinner while maintaining bearing stiffness.

Nevertheless, because the taper-seal area k is located radially beyond the bearing sections, during rotation the effect of centrifugal force on the oil retained in the taper-seal area k proves to be stronger by comparison to a situation in which the taper-seal area is configured for example axially adjoining the radial bearing sections. Since the oil within the taper-seal area k is consequently pressed under centrifugal force radially beyond the sealing area, the meniscus becomes misshapen, which impairs the sealing strength. The meniscus will therefore easily be destroyed and oil will leak if the motor undergoes vibration or shock. By the same token, if the spindle motor were to run at even higher rpm, increase in oil volume would be remarkable since the amount of heat produced in the motor would grow. What is more, oil that has undergone thermal expansion becomes less viscous, making the oil more susceptible to the effect of centrifugal force. Consequently, the amount of oil inflowing from over toward the bearing sections into the taper-seal area k interior increases. Given these circumstances, if owing to dimensional limitations in terms of making the spindle motor thinner in profile sufficient capacity cannot be secured for the taper-seal area k, restricted as it would be in axial dimension, oil inflowing into the sealing area would not all be accommodated, and thus oil would leak to the exterior of the bearing sections.

In hard-disk drives especially, when oil leaking from the bearing sections spatters within the drive device it sticks on the disk-recording surfaces and heads, becoming a causative factor giving rise to read/write errors. What is consequently needed in order to answer calls for accelerated rpm in, while maintaining a configuration that would enable slimming the profile of, spindle motors that are employed in disk drives is to make it possible to increase the capacity within the taper-seal area to retain a larger amount of oil, in a configuration in which the taper-seal area is arranged radially beyond the radial bearing sections, and moreover to render the configuration unlikely to leak oil from the taper-seal area interior.

SUMMARY OF INVENTION

An object of the present invention is to realize a miniature, low-profile spindle motor capable of rotating at high speeds.

A different object of the invention is to realize a spindle motor in which a large amount of oil can be retained and that also enables oil leaks and splashing to be prevented.

Another object is to realize a disk drive in which a large amount of data can be stored and yet in which miniaturization and profile slimming is possible.

Yet another object of the present invention is to realize a miniature, low-profile spindle motor superior in reliability.

In one example of a spindle motor by the present invention, radial bearing sections in which oil is the working fluid are formed in between the inner peripheral surface of the sleeve and the outer peripheral surface of the shaft, and a thrust bearing section is configured in between the upper-end face of the sleeve and the undersurface of a cap-shaped rotor. Formed in between the inner peripheral surface of the rotor cylindrical wall and the outer peripheral surface of the sleeve is a taper-seal area whose gap slopes from radially outward heading inward with respect to the rotational center axis and flares with further separation from the undersurface of the rotor. A boundary surface of the oil retained in the thrust bearing section forms within this taper-seal area.

Inasmuch as the taper-seal area is arranged radially beyond the radial bearing sections in the spindle motor described above, the taper-seal area is not ranged axially beyond the bearing sections—the thrust bearing section and the radial bearing sections. The axial span of the radial bearing sections will accordingly be large even though the spindle motor height is reduced, which thus makes increased "conical stiffness" (stiffness against shaft wobble/run-out) in the radial bearing sections possible. What is more, by rendering the taper seal in a form sloping with respect to the rotational center axis, the tapered space functioning as the sealing area is lengthened, enlarging the capacity within the taper-seal area, and an oil boundary surface forms oriented in a direction sloping with respect to the rotational center axis. In particular, because this means that the boundary surface forms directed radially inward, during rotation centrifugal force will act in a direction pressing in on the oil boundary surface. Thus a structure in which the oil is unlikely to leak is rendered possible.

Since a spindle motor as described above for driving data-recording disks will furthermore have a large loading capacity and be highly stable, notwithstanding the spindle motor is miniature and slimmed, stabilized performance and advanced reliability can be had in disk drives for data-recording disks 2.5 inches and under—in particular miniature, slimmed disk drives that drive 1.8-inch and 1.0-inch data-recording disks.

From the following detailed description in conjunction with the accompanying drawings, the foregoing and other objects, features, aspects and advantages of the present invention will become readily apparent to those skilled in the art.

DETAILED DESCRIPTION

I. First Embodiment

An explanation regarding a spindle motor having to do with a first embodiment of the present invention will be made referring to FIGS. 2 and 3.

(a) Spindle Motor Structure

Figure 2:
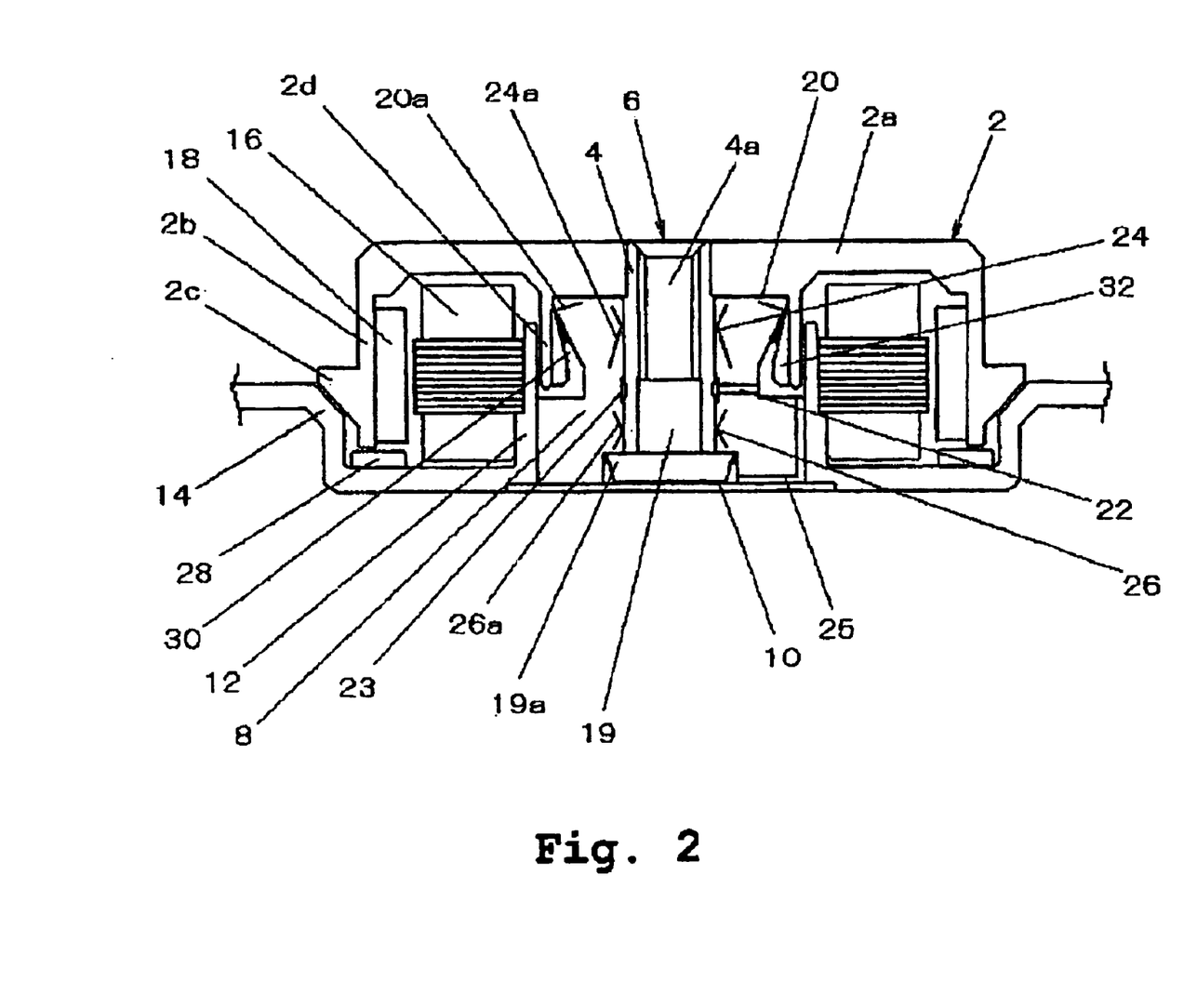
FIG. 2 is a section view diagramming the configurational outline of a spindle motor having to do with a first embodiment of the present invention.
Figure 3:
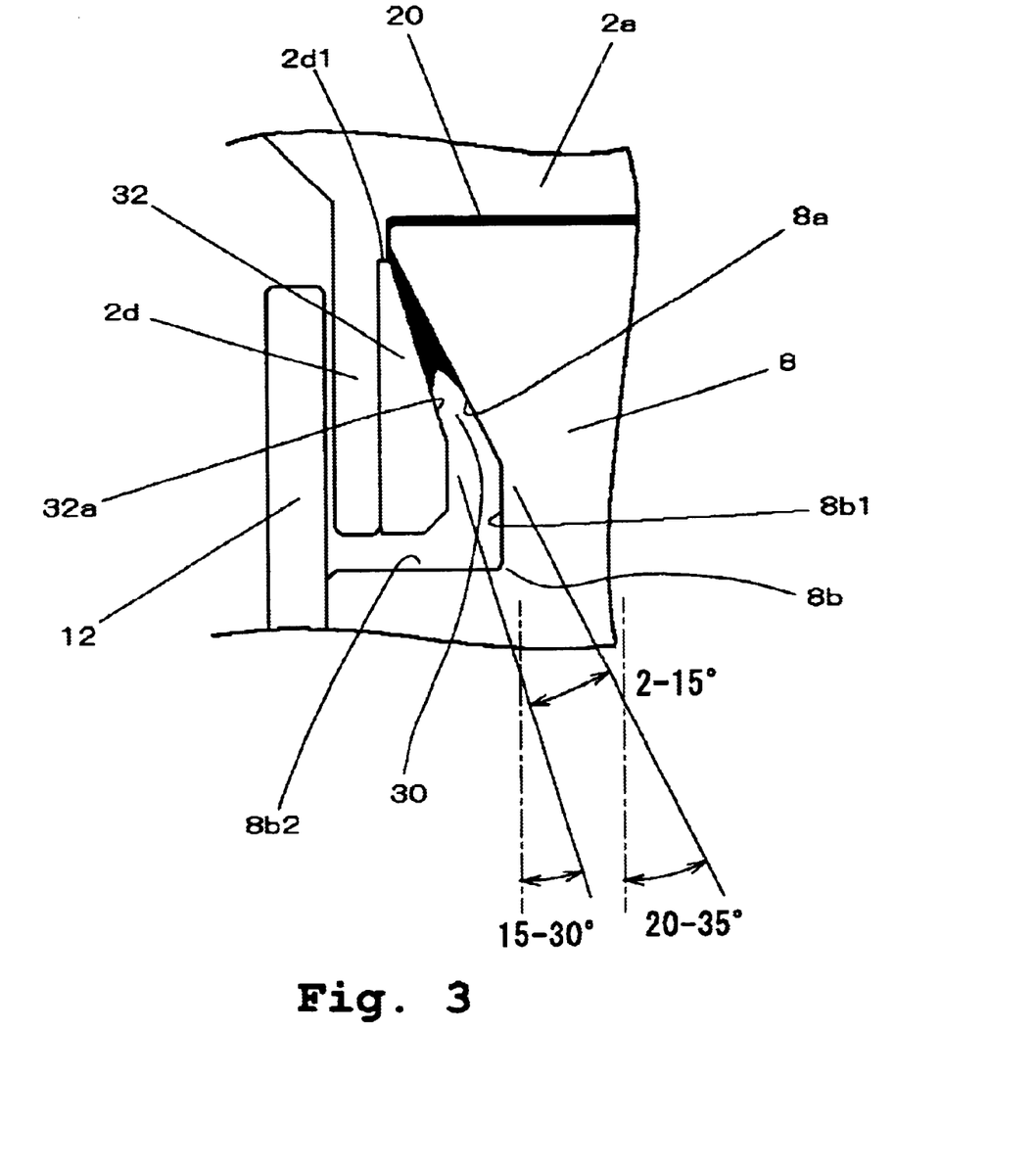
FIG. 3 is an enlarged fragmentary section view depicting magnified a portion of the spindle motor illustrated in FIG. 2.

The spindle motor graphically represented in FIG. 2 is furnished with: a rotor 6 constituted from a rotor hub 2—which is made up of a an approximately disk-shaped upper wall portion 2a (top plate) and a cylindrical peripheral wall portion 2b depending downward from the outer rim of the upper wall portion 2a—and from a shaft 4 one end portion of which perimetrically is fixedly fitted into the central portion of the upper wall portion 2a of the rotor hub 2; a hollow cylindrical sleeve 8 rotatively supporting the shaft 4; a cover member 10 that closes over the lower portion of the sleeve 8; and a bracket 14 with which a cylindrical portion 12 that retains the sleeve 8 is formed unitarily. A stator 16 is arranged on the outer peripheral side of the cylindrical portion 12 of the bracket 14, and a rotor magnet 18 that is radially opposed to the stator 16 across a gap is affixed to the inner peripheral surface of the peripheral wall portion 2b of the rotor hub 2. Likewise, a flange-shaped disk-carrying portion 2c by which recording disks such as a hard disk (illustrated as disk plates 53 in FIG. 7) are carried is provided on the outer peripheral surface of the peripheral wall portion 2b of the rotor hub 2.

A through-hole 4a is formed in the shaft 4, penetrating it coaxially with its rotational center axis. Male threads for fastening a clamp (not illustrated) in order to retain the recording disks on the disk-carrying portion 2c of the rotor hub 2 are clinched in the opening of the through-hole 4a on the rotor-hub 2 side. Meanwhile, a pin member 19 having a flange-shaped portion 19a diametrically larger than the outer diameter of the shaft 4 is fitted in the opening of the through-hole 4a on the cover-member 10 side. A bored-out section in the sleeve 8 is provided with in its cover-member 10 end; and by engagement of the face therein that is oriented orthogonal to the rotational center axis and that stretches from the inner-peripheral surface of the sleeve 8 to the circumferential wall of the bored-out section, with the matching face, oriented orthogonal to the rotational center axis, the flange portion 19a of the pin-member 19, a retainer that holds the rotor 6 in place is configured.

The fact that the rotor 6 retainer is in this way arranged within the space where the bearings are configured means that even if the spindle motor is for example subject to disturbances from without, such as external vibrations and shock, with oil being retained in between the flange portion 19a and the sleeve 8 as will be later described in detail, shock due to external disturbance is attenuated by the damping properties inherent in the oil, keeping down to a minimum damage when the flange portion 19a and the sleeve 8 come into contact. By the same token, even should particles such as abrasion dust be produced by the flange portion 19a and the sleeve 8 coming into contact, the particles will not immediately scatter to the bearing exterior.

(b) Configuration of Bearing Sections

The upper-end face of the sleeve 8 axially opposes via a micro-gap the undersurface of the rotor-hub 2 upper wall portion 2a; oil is retained within this micro-gap under capillarity. Spiral grooves 20a of the pump-in type, for inducing dynamic pressure radially inwardly in the oil (toward the shaft 4) when the rotor 6 spins, are formed on upper-end face of the sleeve 8 fronting on the micro-gap, wherein a thrust bearing section 20 is configured.

The outer circumferential surface of the shaft 4 is radially opposed to the inner circumferential surface of the sleeve 8 via a micro-gap; oil within this micro-gap is retained by virtue of the capillary phenomenon. A first communicating hole 22 that radially penetrates the sleeve 8 is formed in the sleeve 8 so as to open onto, in approximately the midportion axially of, a micro-gap formed in between the outer peripheral of the shaft 4 and the inner circumferential surface of the sleeve 8. The radial clearance of the micro-gap in between the shaft 4 and the sleeve 8 is formed with a gas intervention 23 in which air that has invaded through the first communicating hole 22 interposes. (The specific configuration of the gas intervention 23 will be described in detail later.)

Oil retained in the micro-gap defined in between the outer circumferential surface of the shaft 4 and the inner circumferential surface of the sleeve 8 is partitioned axially by the gas intervention. Herringbone grooves 24a of the pump-up type, having an asymmetrical form in the axial direction, to induce in the oil dynamic pressure directed axially upwardly (upper-end direction of the shaft 4) when the rotor 6 spins are formed on the inner circumferential surface of the sleeve 8 fronting on the micro-gap to the axially upper side (thrust-bearing-section 20 side) of the gas intervention 23, wherein an upper radial bearing section 24 is configured. Likewise, herringbone grooves 26a having a symmetrical form in the axial direction, to induce in the oil dynamic pressure directed toward the midportion from either end axially thereof when the rotor 6 spins are formed on the inner circumferential surface of the sleeve 8 fronting on the micro-gap to the axially lower side (bracket 14 side) of the gas intervention 23, wherein an lower radial bearing section 26 is configured.

Oil is retained continuously in between the upper radial bearing section 24 of the pair of radial bearing sections 24 and 26—configured on the upper side of the gas intervention 23—and the adjoining thrust bearing section 20. Because the thrust bearing section 20 and the upper radial bearing section 24 each induce in the oil dynamic pressure acting in the direction of the other, adjoining bearing section, a pressure peak arises at the boundary area of the two bearing sections, i.e., proximate the upper-end portion of the inner circumferential surface of the sleeve 8. This means that cooperation of the thrust bearing section 20 and the upper radial bearing section 24 yields axial supporting pressure that acts radially on the rotor 6, and at the same time yields axial supporting pressure that acts axially upward (in the lifting direction with respect to the bracket 14). An annular thrust yoke 28 formed from a ferromagnetic material is disposed in a position on the bracket 14 axially opposing the undersurface of the rotor magnet 18, whereby the rotor 6 is magnetically biased axially downward (toward the bracket 14) by the magnetic attraction occurring in between the thrust yoke 28 and the rotor magnet 18. The magnetic force that acts on the rotor 6, and the lifting force on the rotor 6 that is generated by cooperation of the thrust bearing section 20 and the upper radial bearing section 24 thus balance, supporting loads axially either way on the rotor 6, and stabilizing and maintaining the posture of the rotor 6 during rotation. It should be understood that instead of by the configuration in which the thrust yoke 28 is arranged on the bracket 1, it is possible to generate force magnetically attracting the rotor 6 by, for example, arranging the rotor magnet 18 and the stator 16 to displace their magnetic centers axially from each other.

(c) Seal Structure

An annular recess radially opposing the first communicating hole 22 where it opens on the inner circumferential surface of the sleeve 8 is provided in the outer circumferential surface of the shaft 4. The annular recess in the shaft 4 is formed into an inclined contour along either end axially such that from the midportion of the annular recess in the axial direction outer diameter of the shaft 4 gradually expands heading toward the upper and lower radial bearing sections 24 and 26, wherein a pair of tapered spaces is defined in between the annular recess and the inner circumferential surface of the sleeve 8. End areas of the oil retained in the upper and lower radial bearing sections 24 and 26 are in contact on the one hand with air that through the first communication hole 22 has been taken into the gas intervention 23, where they form respective boundary surfaces within each tapered space in the gas intervention 23.

The outer peripheral face of the flange portion 19a is formed into an inclined contour such that the outer diameter of the pin member 19 contracts in the direction heading toward the cover member 10, wherein a tapered space is formed in between the outer peripheral face of the flange portion 19a inclined contour, and the inner circumferential surface of the bored-out section of the sleeve 8. The tapered space defined in between the outer peripheral face of the flange portion 19a inclined contour, and the inner circumferential surface of the bored-out section of the sleeve 8 communicates with exterior air through a second communicating hole 25 defined in between the bottom-end face of the sleeve 8 and the cover member 10, and in between the outer circumferential surface of the sleeve 8 and the inner circumferential surface of the cylindrical portion 12 of the bracket 14.

Oil retained in the lower radial bearing section 26 traverses the gap formed in between the one retainer-constituting face that—oriented orthogonal to the rotational center axis—stretches from the inner-peripheral surface of the sleeve 8 to the circumferential wall of the bored-out section, and the other retainer-constituting face—oriented orthogonal to the rotational center axis—of the flange portion 19a of the pin-member 19, and contacts air within the tapered space defined in between the outer peripheral face of the flange portion 19a inclined contour, and the inner circumferential surface of the bored-out section of the sleeve 8, thus forming a boundary surface. In sum, the oil retained in the lower radial bearing section 26 is continuous from the boundary surface located within the tapered space defined on the lower-radial-bearing-section 26 side of the gas intervention 23, to the boundary surface located within the tapered space defined in between the outer peripheral face of the flange portion 19a inclined contour and the inner circumferential surface of the bored-out section of the sleeve 8.

Accordingly, the balancing of pressure that acts on the oil boundary surface along the tapered space defined on the lower-radial-bearing-section 26 side of the gas intervention 23, and on the oil boundary surface along the outer peripheral face of the flange portion 19a inclined contour, gives rise to a force that restrainingly presses on the oil retained in the lower radial bearing section 26. This means that if the amount of oil retained in the lower radial bearing section 26 has decreased, oil retained within the tapered space defined on the lower-radial-bearing-section 26 side of the gas intervention 23, and within the tapered space defined in between the outer peripheral face of the flange portion 19a inclined contour and the inner circumferential surface of the bored-out section of the sleeve 8 will under capillary action be supplied toward the lower radial bearing section 26. Conversely, if due to temperature elevation or the like the volume of oil retained within the lower radial bearing section 26 has expanded, the increased volume of oil will be accommodated by the oil boundary surface shifting in the direction in which its inter-surface dimension within the tapered space defined on the lower-radial-bearing-section 26 side of the gas intervention 23, and within the tapered space defined in between the outer peripheral face of the flange portion 19a inclined contour and the inner circumferential surface of the bored-out section of the sleeve 8, further expand.

A taper-seal area 30 in which the boundary surface of the oil retained by the thrust bearing section 20 is located will be explained with reference to FIG. 3. To illustrate diagrammatically the structure of the taper-seal area 30 in outline, FIG. 3 is a fragmentary enlarged section view that is a partially magnified portion of FIG. 2.

The outer circumferential surface of the sleeve 8, amounting to an outer circumferential side of the upper radial bearing section 24, is formed into an inclined face 8a such that the sleeve 8 outer diameter contracts in the direction heading toward the bracket 14, i.e., with further separation from the sleeve 8 upper-end face, which is a component of the thrust bearing section 20. In addition, an annular stepped section 8b made up of a perpendicular face 8b1 that is continuous with the inclined face 8a, and a flat face 8b2 that is orthogonal to and continuous with the perpendicular face 8b1, is provided in the outer peripheral surface of the sleeve 8. The first communicating hole 22 opening that is on the outer-circumferential-face side of the sleeve 8 opens into the stepped section 8b.

In this same part of the spindle motor, an annular projection 2d (cylindrical wall), whose inner circumferential surface is at a slightly larger diameter than the outer diameter of the sleeve 8 at its upper-end face, is provided on the undersurface of the rotor-hub 2 upper wall portion 2a. The annular projection 2d is accommodated inside the stepped section 8b of the sleeve 8, out of contact with the inner circumferential surface of the cylindrical portion 12 of the bracket 14, as well as the flat face 8b2 of the stepped section 8b.

A ring-shaped member 32 is affixed—by for example adhering or pressure-fitting means—to the inner circumferential surface of the annular projection 2d and is formed with an inclined face 32a, such that the inner peripheral surface of the ring-shaped member 32 is out of contact with and radially opposes to the inclined face 8a of the sleeve 8, and such that the inter-surface dimension of the gap formed in between it and the inclined face 8a contracts in the direction heading toward the bracket 14, i.e., with further separation from the thrust-bearing-section 20 constituting undersurface of the upper wall portion 2a of the rotor-hub 2. Positioning of the ring-shaped member 32 in the axial direction is in this case facilitated by providing, as is illustrated in FIG. 3, an abutting face 2d1 along the inner periphery of the annular projection 2d to bring the upper-end portion of the ring-shaped member 32 into abutment with the abutting face 2d1. Furthermore, the ring-shaped member 32 is accommodated, together with the annular projection 2d, inside the stepped section 8b provided in the sleeve 8 outer peripheral surface, out of contact with the flat face 8b2.

The oil retained in the thrust bearing section 20 forms a boundary surface with air and is held within the tapered gap formed in between the inclined face 8a provided on the outer peripheral surface of the sleeve 8 and the inclined face 32a provided on the inner peripheral surface of the ring-shaped member 32, and whose inter-surface dimension gradually expands heading toward the bracket 14. In particular, a taper-seal area 30 is constituted by this tapered gap formed in between the inclined face 8a provided on the sleeve 8 outer peripheral surface, and the inclined face 32a provided on the inner peripheral surface the ring-shaped member 32. Accordingly, the oil held continuously in between the thrust bearing section 20 and the upper radial bearing section 24 is retained in a position in which the pressure acting on the boundary surface where the oil edge portion on the thrust-bearing-section 20 side is within the taper-seal area 30 balances with the pressure acting on the boundary surface where the oil edge portion on the upper-radial-bearing-section 24 side is within the tapered space formed at the edge area of the gas intervention 23 the upper radial bearing section 24 side.

In the present embodiment, the inclination angle of the inclined face 8a provided on the outer peripheral surface of the sleeve 8 is set within a range of approximately 20 to 35 degrees, preferably 26 to 33 degrees approximately, with respect to the rotational center axis; likewise, the inclination angle of the inclined face 32a of the ring member 32 is set within a range of approximately 15 to 30 degrees, preferably 20 to 27 degrees approximately, with respect to the rotational center axis. The taper angle, moreover, of the taper-seal area 30 formed in between the inclined face 8a provided on the outer peripheral surface of the sleeve 8 and the inclined face 32a provided on the inner peripheral surface of the ring-shaped member 32 is set within a range of approximately 2 to 15 degrees, preferably 5 to 10 degrees approximately.

The fact that, as set forth above, the inclination angles of the taper-seal 30 constituting inclined face 8a (provided on the sleeve 8 outer peripheral surface) and inclined face 32a (on the ring member 32) are each of differing slope with respect to the rotational center axis means that the conformation of the taper-seal area 30 itself is inclined heading radially inward. These factors set the minimum clearance in the gap from the taper-seal area 30 to the thrust bearing section 20 smaller than the inter-surface axial clearance in the thrust-bearing-section 20 micro-gap that arises when the rotor 6 has been lifted by dynamic pressure generated in the thrust bearing section 20. Setting the inter-surface dimensional relationships for the gap along the taper seal area 30 and the micro-gap in the thrust bearing section 20 to be as noted above makes oil flow between the seal and bearing sections go smoothly.

In sum, the balancing of pressure acting on the oil boundary surface along the taper seal area 30, and on the oil boundary surface along the tapered space formed at the edge area of the gas intervention 23 on the upper radial bearing section 24 side, gives rise to a force that restrains the oil retained throughout the thrust bearing section 20 and upper radial bearing section 24, by tending to push the oil into the bearing sections. This means that if the amount of oil retained in the thrust bearing section 20 or the upper radial bearing section 24 has decreased, oil retained within the taper-seal area 30 and within the tapered space formed at the edge area of the gas intervention 23 on the upper radial bearing section 24 side will under capillary action be supplied toward the thrust bearing section 20 and toward the upper radial bearing section 24. Conversely, if due to temperature elevation or the like the volume of oil retained within the thrust bearing section 20 or the upper radial bearing section 24 has expanded, the increased volume of oil will be accommodated by the oil boundary surface shifting in the direction in which its inter-surface dimension within the taper-seal area 30 and within the tapered space formed at the edge area of the gas intervention 23 on the upper radial bearing section 24 side further expand.

Again, because the taper-seal area 30 is configured to be inclined with respect to the rotational center axis, the boundary surface of the oil forms directed radially inward in accordance with the inclination angle of the taper-seal area 30 with respect to the rotational center axis. Consequently, the fact that the oil boundary surface is pressed depth-ward, i.e., toward the thrust bearing section 20, under centrifugal force when the rotor 6 is rotating fortifies the sealing strength. This means that oil outflow from the taper-seal area 30 will be impeded even in a high-rpm spindle motor. Configuring the taper-seal area 30 to be inclined with respect to the rotational center axis, moreover, compared with a situation in which the seal is configured parallel with the rotational center axis, makes it possible to lengthen the tapered gap that functions as a seal area in even a low-profile spindle motor, for example, and thereby enlarge the capacity of the taper-seal area 30. This enlarged capacity enables the taper-seal area 30 to retain the oil even in the wake of an increased amount flowing into the taper-seal area 30 on account of heightened-speed rotation in a spindle motor.

In particular, as defined by the foregoing configuration, with the taper-seal area 30 being arranged radially beyond the radial bearing sections 24 and 26, the taper-seal area 30 is not ranged axially beyond the bearing sections—i.e., the thrust bearing section 20 and the radial bearing sections 24 and 26—which sets up a configuration that enables low-profile slimming of a spindle motor; and meanwhile with the taper-seal area 30 being contoured at an inclination with respect to the rotational center axis, the tapered space that functions as a seal area is made longer compared to the case in which the taper seal area is configured in a direction either parallel or orthogonal to the rotational axis, which permits the capacity of the taper seal interior to be enlarged. Since this means, moreover, that the oil boundary surface forms oriented in a direction sloping with respect to the rotational center axis, during rotation centrifugal force will act in a direction pressing in on the lubricant oil boundary surface, which also makes for heightened seal strength.

Again as defined by the foregoing configuration, the taper-seal area 30 being constituted by the inclined face 8a formed on the outer peripheral surface of the sleeve 8, and the inclined face 32a formed on the inner peripheral surface of the ring-shaped member 32 facilitates the processes on the rotor-hub 2 end of the motor—where the contour is complex—which means that the motor can be made cost-reduced. The foregoing configuration, furthermore, is one in which the rotor hub 2 and the shaft 4 are formed from separate parts, in which case the rotor hub 2 and the shaft 4 may be clinched prior to inserting the shaft 4 into the sleeve 8, making it possible to preserve assembly precision in terms of right-angularity of the shaft 4 with respect to the rotor hub 2. The aggravation of RRO (repeatable run-out) originating in defective rotor hub 2 and shaft 4 assemblies is accordingly controlled.

II. Second Embodiment

An explanation regarding a spindle motor having to do with a second embodiment of the present invention will be made referring to FIGS. 4 and 5.

(a) Spindle Motor Configuration

Figure 4:
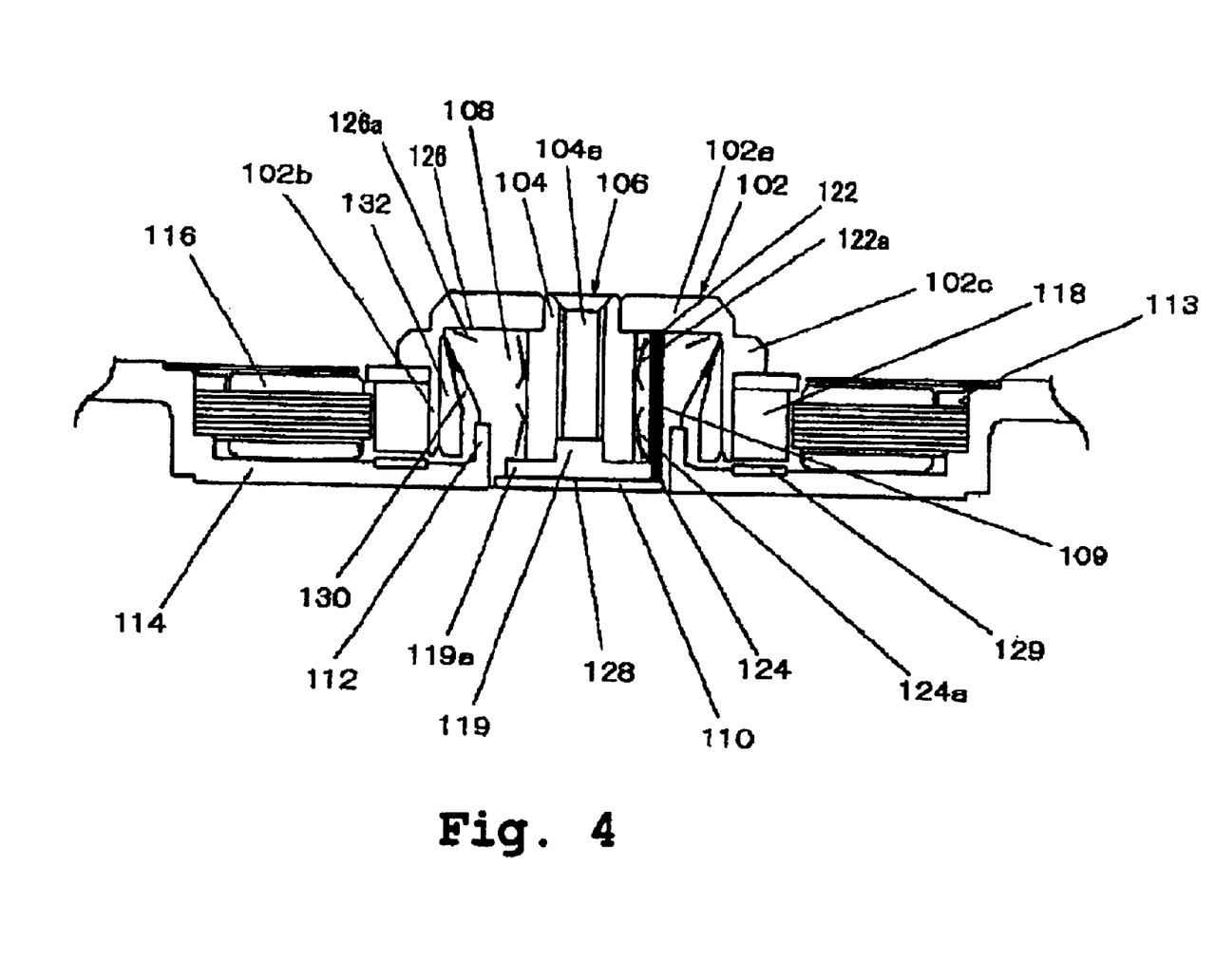
FIG. 4 is a section view diagramming the configurational outline of a spindle motor having to do with a second embodiment of the present invention.

The spindle motor graphically represented in FIG. 4 is furnished with: a rotor 106 constituted from a rotor hub 102—which is made up of a an approximately disk-shaped upper wall portion 102a (top plate) and a cylindrical peripheral wall portion 102b (cylindrical wall) depending downward from the outer rim of the upper wall portion 102a—and from a shaft 104 one end portion of which perimetrically is fixedly fitted into the central portion of the upper wall portion 102a of the rotor hub 102; a hollow cylindrical sleeve 108 rotatively supporting the shaft 104; a cover member 110 that closes over the lower portion of the sleeve 108 and opposes the end face of the shaft 104 along its free end; and a bracket 114 formed unitarily with a cylindrical portion 12 into which the sleeve 108 is fitted. The bracket 114 has an approximately bowl-shaped form centered on the cylindrical portion 112, and a stator 116 having a plurality of radially inward-projecting teeth is provided on an inner circumferential surface 113 of the peripheral wall that lends the bowl-shaped configuration to the bracket 114. A rotor magnet 118 is affixed to the outer peripheral surface of the peripheral wall portion 102b of the rotor hub 102, wherein the rotor magnet 118 opposes the radially inward side of the stator 116 across a gap. Likewise, a flange-shaped disk-carrying portion 102c by which recording disks such as a hard disk (illustrated as disk plates 53 in FIG. 7) are carried is provided on the outer peripheral surface of the peripheral wall portion 102b of the rotor hub 102.

A through-hole 104a is formed in the shaft 104, penetrating it coaxially with its rotational center axis. Male threads (not illustrated) for fastening a clamp (not illustrated) in order to retain the recording disks on the disk-carrying portion 102c of the rotor hub 102 are clinched in the opening of the through-hole 104a on the rotor-hub 102 side. Meanwhile, a pin member 119 having a flange-shaped portion 119a diametrically larger than the shaft 104 outer diameter is fitted in the opening of the through-hole 104a on the cover-member 110 side. A bored-out section in the sleeve 108 is provided in its cover-member 110 end; and by engagement of the face therein that is oriented orthogonal to the rotational center axis and that stretches from the inner-peripheral surface of the sleeve 108 to the circumferential wall of the bored-out section, with the matching face, oriented orthogonal to the rotational center axis, of the flange portion 119a of the pin-member 119, a retainer that holds the rotor 106 in place is configured.

(b) Configuration of Bearing Sections

An unbroken series of micro-gaps is formed in between the upper-end face of the sleeve 108 and the undersurface of the upper wall portion 102a of the rotor hub 102; and—continuing from the upper wall portion 102a of the rotor hub 102—in between the outer circumferential surface of the shaft 104 and the inner circumferential surface of the sleeve 108; and continuous therewith, in between the bored-out section of the sleeve 108 and the flange portion 119a of the pin-member 119; and in between the inner face of the cover member 110 and, axially opposing it, the end face of the pin member 119. (A configuration of this sort will be denoted a "fully-filled structure" below.)

Herringbone grooves 122a that induce hydrodynamic pressure in the oil when the rotor 106 spins are formed on the inner circumferential surface of the sleeve 108 alongside its upper-end face (alongside the rotor-hub 102 end). The herringbone grooves 122a are constituted by linked pairs of spiral striations inclining into each other from mutually opposing directions with respect to the rotary direction. An upper radial bearing section 122 is thus configured between the inner circumferential surface of the sleeve 108 where the grooves 122a are formed and the outer circumferential surface of the shaft 104. Likewise, herringbone grooves 124a that induce hydrodynamic pressure in the oil when the rotor 106 spins are formed on the inner circumferential surface of the sleeve 108 alongside the free-end portion of the shaft 104 (alongside the cover member 110). The herringbone grooves 124a are constituted by linked pairs of spiral striations inclining into each other from mutually opposing directions with respect to the rotary direction. A lower radial bearing section 124 is thus configured between the inner circumferential surface of the sleeve 108 where the grooves 124a are formed and the outer circumferential surface of the shaft 104.

In this configuration, of the spiral striations that constitute the herringbone grooves 122a formed in the upper radial bearing section 122, those spiral striations located alongside the upper end of the sleeve 108 are established to be longer in axial dimension than the spiral striations located alongside the lower radial bearing section 124. Likewise, of the spiral striations that constitute the herringbone grooves 124a formed in the lower radial bearing section 124, those spiral striations located alongside the lower end of the sleeve 108 are established to be longer in axial dimension than the spiral striations located alongside the upper radial bearing section 122. This configuration makes it so that maximum pressure in the upper and lower radial bearing sections 126 and 124 appears in loci that are biased toward the midsections of the upper and lower radial bearing sections 126 and 124 where the bends in which the spiral striations link are located, rather than toward the longitudinal centers of the bearing sections.

In addition, pump-in spiral grooves 126a that induce radially inward-heading (toward the shaft 104) pressure in the oil when the rotor 106 spins are formed on the sleeve 108 upper-end face (face axially opposing the upper wall portion 102a). A thrust bearing section 126 is thus configured between the upper-end face of the sleeve 108 and the undersurface of the upper wall portion 102a of the rotor-hub 102. Furthermore, a hydrostatic bearing 128 exploiting the oil internal pressure heightened, as will later be described in detail, by the spiral grooves 126a of the thrust bearing section 126 is constituted in between the inner face of the cover member 110 and, axially opposing it, the end face of the pin member 119.

How the bearings configured as noted above function for journal support will be described.

Pumping force from the herringbone grooves 122a and 124a in the upper and lower radial bearing sections 122, 124 rises attendant on rotation of the rotor 106, producing fluid dynamic pressure. As far as pressure distribution in the upper and lower radial hydrodynamic bearings 122, 124 is concerned, pressure rises abruptly from alongside either ends of the herringbone grooves 122a, 124a and becomes maximal at the bends in which the spiral striations link. The fluid dynamic pressure generated in the upper and lower radial hydrodynamic bearings 122, 124, is utilized to journal-support the shaft 104 axially along its upper/lower ends, and plays a role in centering the shaft 104 and restoring it from deviations.

Radially inward-heading pressure is induced in the oil in the thrust bearing section 126 by the pump-in spiral grooves 126a attendant on rotation of the rotor 106. The oil is stimulated to flow by the radially inward-heading pressure, raising the oil internal pressure and generating fluid dynamic pressure acting in a lifting direction on the rotor 106. It should be understood that the fluid dynamic pressure induced in the thrust bearing section 126 does not rise abruptly as is the case with the upper and lower radial hydrodynamic bearings 122, 124; rather, at maximum it is at a level exceeding atmospheric pressure to a certain degree. The oil retained—in continuity with the upper wall portion 102a of the rotor hub 102—in between the outer circumferential surface of the shaft 104 and the inner circumferential surface of the sleeve 108, and continuous therewith, in between the end face of the shaft 104 and the inner face of the cover member 110 is pressure-wise brought into an essentially sealed state by the pressure generated in the thrust bearing section 126. Thus, the fact that the internal pressure of the oil retained in the hydrostatic bearing 128 constituted in between the end face of the shaft 104 along its free end and the inner face of the cover member 110 will be pressure equal to the oil internal pressure that due to the fluid dynamic pressure induced in the thrust bearing section 126 has been raised, means that cooperation by the thrust bearing 126 and the hydrostatic bearing 128 enables sufficient lift to be put on the rotor 6.

With the herringbone grooves 126a provided in the upper radial bearing section 122 being axially asymmetrical in form, dynamic pressure that presses downward on the oil is generated; meanwhile with the herringbone grooves 124a provided in the lower radial bearing section 124 being axially asymmetrical in form, dynamic pressure that presses upward on the oil is generated. Thus, at the same time rotation of the rotor 106 is supported by the upper and lower radial bearing sections 122 and 124, the pressure in the region between the upper radial bearing section 122 and the lower radial bearing section 124 is kept at positive pressure—atmospheric pressure or greater; negative pressure is prevented from arising.

In the foregoing first embodiment a configuration in which the edge areas of the oil retained in the bearing sections are exposed to air was adopted. (A configuration of this kind will be denoted a "partially filled" structure below.) The partially filled structure is a configuration wherein in each bearing section only a single place in the interval from the oil edge area on the one hand to the edge area on the other is rendered a region in which the pressure becomes maximal, and is a configuration wherein the formation and arrangement of the dynamic-pressure-generating grooves in each bearing section such that heading toward either edge area the pressure gradually drops makes it possible for air bubbles mixed into the oil area to be automatically discharged. The partially filled structure makes it so that oil is not held in regions where exerting control over the oil internal pressure and flow would be difficult, thereby eliminating unstable factors from within the bearing sections and making it possible to gain stabilized bearing performance. Nevertheless, numerous inclined faces for forming the tapered gaps that function as seal areas have to be provided, and further, conformations that function as communicating holes (for example, conformations like the first and second communicating holes 22 and 25 in the foregoing first embodiment) prove to be necessary. Such requirements with the partially filled structure complicate processing the parts that compose the bearings, which in being an impediment to reducing the cost of manufacturing the bearings and spindle motors in which they are utilized is a concern.

To address such issues, in the second embodiment configuring each bearing section as noted above means that in any region of the oil retained within the bearings the internal pressure will be equal to that of the oil retained in the thrust bearing section 126, with there being no incidents of negative pressure in which the internal pressure in the oil retained within the bearing micro-gaps goes under atmospheric pressure. Rendering the bearings in a fully filled structure is thus made possible, which simplifies the structure and enables holding down manufacturing costs further.

As is diagrammatically shown in FIG. 4 an annular thrust yoke 129 formed from a ferromagnetic material is disposed in a position on the bracket 114 opposing the rotor magnet 118, generating magnetically attractive force in the axial direction in between the thrust yoke 129 and the rotor magnet 118 that balances with the rotor 106 lifting pressure produced in the thrust bearing section 126 and the hydrostatic bearing 128. This balancing stabilizes the thrust-direction support of the rotor 106, and holds in check occurrence of excessive lift that would raise the rotor 106 higher than is necessary. This sort of magnetic urging on the rotor 106 can be effectuated also by, for example, displacing the magnetic centers of the rotor magnet 118 and the stator 116 axially from each other.

(c) Configuration and Function of Communicating Hole

A communicating hole 109 is formed in the sleeve 108, axially penetrating it to communicate the region radially inward of the thrust bearing section 126, and the region radially beyond the pin member 119 flange-shaped portion 119a. Oil continuous with the oil retained within the series of bearing gaps as described above is retained within the communicating hole 109. Likewise, the internal pressure of the oil held within the communicating hole 109 is in balance with the internal pressure of the oil held in each bearing section.

In a situation in which the micro-gap formed in between the sleeve 108 inner circumferential surface and the shaft 104 outer circumferential surface, wherein the upper and lower thrust bearing section 122 and 124 are constituted, sustains a predetermined dimension, the oil retained in each bearing section will be at least equal in pressure to that generated in the thrust bearing section 126, meaning that the internal pressure of the oil will not become negative-pressured. Nevertheless, if due to error processing the inner circumferential surface of the sleeve 108 and the outer circumferential surface of the shaft 104 the micro-gap formed in between the sleeve 108 inner circumferential surface and the shaft 104 outer circumferential surface is made wider along the axial upper end than along the lower end, the dynamic pressure generated on the lower radial bearing section 124 side will exceed the dynamic pressure generated in the upper radial bearing section 122, producing in the oil a flow heading from the lower to the upper side in the axial direction. This would be a concern lest the internal pressure of the oil retained along the sleeve 108 and the cover member 110—i.e., depth-ward in the bearing gap—become negative-pressured. By the same token, should the micro-gap formed in between the inner circumferential surface of the sleeve 108 and the outer circumferential surface of the shaft 104 be made narrower along the axial upper end than along the lower end, the dynamic pressure generated in the herringbone grooves 122a provided in the upper radial bearing section 122 would become greater than the predetermined pressure, flowing oil from along the upper-edge area to along the lower-edge area in the axial direction. This would be a concern lest the internal pressure of the oil retained surrounding the pin member 119 be elevated more than necessary and produce excessive lift on the rotor 106. Notwithstanding these concerns, since an imbalance in the internal pressure of the oil retained within the bearing sections occurs occasions a flow of oil through the communicating hole 109 from the side where the pressure is higher to the side where it is lower, resolves the state of internal imbalance. Inasmuch as equilibrium in oil pressure through the communicating hole 109 is designed for, generation of air bubbles and production of excessive lift on the rotor 106 due to negative pressure is prevented; meanwhile, inasmuch as the tolerance range for processing errors is markedly broadened, yields are improved.

It will be appreciated that arranging the communicating hole 109 so that one end opens radially inward of the thrust bearing section 126 makes it so that the oil pressure is kept constant within a region of pressure higher than atmospheric pressure. In this way, the bearing sections deeper inward than the thrust bearing section 126 are put by the thrust bearing section 126 into a sealed condition pressure-wise. Were for example the one end of the communicating hole 109 open in between a bearing section and a taper seal area, as long as the predetermined dynamic pressure is generated in the bearing section, such as when motor rotation is steady, sufficient supporting stiffness would be produced, and the likelihood that knocking or grazing in the bearing section would arise would therefore be low. If, however, the motor rotational speed should drop, such as when the motor is halted, inasmuch as the one end of the communicating hole 109 would open into an area apart from the region sealed pressure-wise—i.e. into a region where the oil pressure would be equal to or otherwise below atmospheric pressure—the oil pressure that within the bearing section had been sustained high would drop abruptly, on account of the pressure difference with the oil pressure in the area where the communicating hole 109 opens. By the pressure within the bearing section thus dropping abruptly, the rotor 106 would be prone to wobbling or running eccentrically, meaning that knocking and grazing between parts such as the shaft 104 and the sleeve 108 that constitute the bearing section would arise. While conceivable causes for this include weight imbalance in the rotor 106 incorporating the recording disks carried by the rotor hub 102a, processing and assembly tolerances in the parts composing the motor, or imbalance in magnetic force acting in between the stator 116 and the rotor magnet 118, with such knocking and grazing in the bearing section reoccurring every time the motor is halted, the striking wear and tear on the parts composing the bearing sections would degrade the motor reliability and durability.

To address these issues, by having the communicating hole 109 open radially inward of the thrust bearing section 126, the pumping by the spiral grooves 126a that induces radially-inward-acting fluid dynamic pressure in the oil will operate until just before the motor comes to a complete halt. Since the thrust bearing section 126 thus functions as a partition wall pressure-wise, pressure drop within the bearing sections is eased, and knocking an grazing of the parts that make up the bearing sections is moderated, which holds degradation in motor reliability and durability in check.

(d) Configuration of Seal Area

Figure 5:
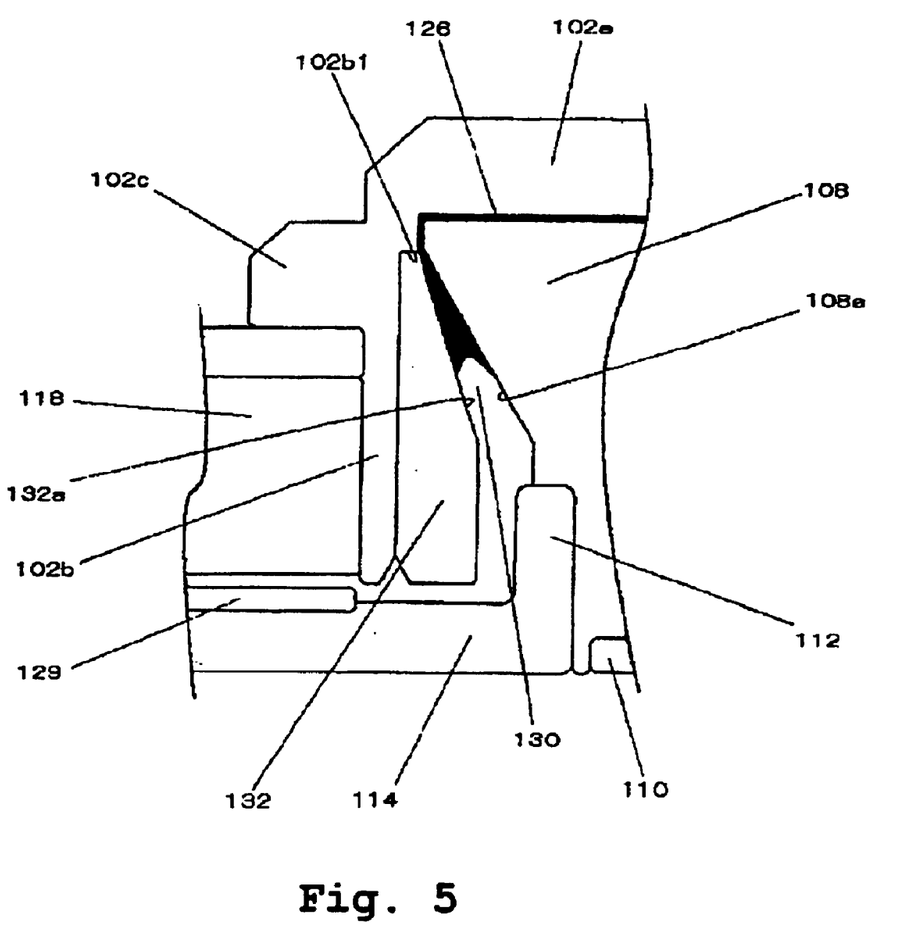
FIG. 5 is an enlarged fragmentary section view depicting magnified a portion of the spindle motor illustrated in FIG. 4.

A taper seal area 130 in which the boundary surface of the oil retained by the thrust bearing section 126 is located will be next be explained, with reference to FIG. 5. To illustrate diagrammatically the structure of the taper-seal area 130 in outline, FIG. 5 is a fragmentary enlarged section view that is a partially magnified portion of FIG. 4. Explanation of the basic configuration of the taper-seal area 130 will be omitted, since the configuration is similar to that of taper-seal area 30 in the foregoing first embodiment.

In FIG. 5, the outer circumferential surface of the sleeve 108, amounting to an outer circumferential side of the radial bearing sections 122 and 124, is formed into an inclined face 108a such that the outer diameter of the sleeve 108 contracts in the direction heading toward the bracket 114, i.e., with further separation from the upper-end face of the sleeve 108, which is a component of the thrust bearing section 126. Here, as far as the configuration of the sleeve 108 in the second embodiment is concerned, it does not have a conformation like the stepped section in the foregoing first embodiment. A ring-shaped member 132, furthermore, is affixed—by for example adhering or pressure-fitting means—to the inner circumferential surface of the cylindrical wall 102b of the rotor-hub 102 and is formed with an inclined face 132a, such that the inner peripheral surface of the ring-shaped member 132 is out of contact with and radially opposes to the inclined face 108a of the sleeve 108, and such that the inter-surface dimension of the gap formed in between it and the inclined face 108a contracts in the direction heading toward the bracket 114, i.e., with further separation from the thrust-bearing-section 126 constituting undersurface of the upper wall portion 102a of the rotor-hub 102. Positioning of the ring-shaped member 132 in the axial direction is in this case facilitated by providing, as is illustrated in FIG. 5, an abutting face 102b1 along the inner periphery of the cylindrical wall 102b to bring the upper-end portion of the ring-shaped member 132 into abutment with the abutting face 102b1.

The oil retained in the thrust bearing section 126 forms a boundary surface with air and is held within the tapered gap formed in between the inclined face 108a provided on the outer peripheral surface of the sleeve 108 and the inclined face 132a provided on the inner peripheral surface of the ring-shaped member 132, and whose inter-surface dimension gradually expands heading toward the bracket 114. In particular, a taper-seal area 130 is constituted by this tapered gap formed in between the inclined face 108a provided on the outer peripheral surface of the sleeve 108, and the inclined face 132a provided on the inner peripheral surface of the ring-shaped member 132. With the inclination angles of the taper-seal 130 constituting inclined face 108a on the sleeve 108 side and the inclined face 132a on the ring member 132 side each being of differing slope, the taper-seal area 130 is configured at an inclination with respect to the rotational center axis likewise as with the taper-seal area 30 in the first embodiment. This makes it possible for the same actions and effects as with the taper-seal area 30 in the first embodiment to be demonstrated also by means of the taper-seal area 130 configured as noted above in the second embodiment.

It will be understood that since the spindle-motor bearing sections in the second embodiment are in a fully-filled structure as set forth above, the oil retained within the bearings is exposed to air only within the taper-seal area 130, and the bearing spaces apart from the taper-seal area 130 are all filled with oil. This means that compared with dynamic-pressure bearings in a partially-filed structure, as in the first embodiment, wherein oil is held in only the required places, with dynamic-pressure bearings in a fully-filed structure, wherein oil is retained throughout the bearing interior overall, the amount of oil retained is naturally greater. Yet the amount of oil retained within the bearings being greater means that the amount of oil that increases due to temperature elevation, etc. will be that much larger. Nevertheless, the taper-seal area 130 configuration is especially advantageous for dynamic-pressure bearings in this sort of fully-filled structure wherein the amount of oil retained is large, because the capacity within the seal area is large, and the sealing strength is high. These advantages stem from arranging the taper-seal area 130 diametrically outward beyond, to be larger in diameter than, the bearing sections, and from lending the taper-seal area 130 a configuration enabling the tapered space functioning as the sealing area to be lengthened.

Thus the configuration in the foregoing second embodiment, while providing for a bearing structure enabling simplification and cost reduction in that a thrust plate is not required as a component of the thrust bearing section, and providing for desired stiffness in the bearings, rendering the bearing sections in a fully-filled structure means that the spindle motor can be made even lower in profile and reduced in cost, and also enables the motor to handle higher rpm.

III. Third Embodiment

A third embodiment of the present invention, which is illustrated in FIG. 4, will be explained with reference to FIG. 6. In this case, the spindle motor diagrammed in FIG. 6 is apart from the rotor configuration the same as the spindle motor of the second embodiment illustrated in FIG. 4; sites having an identical configuration therewith are labeled with the same reference marks and explanation thereof will be omitted.

Figure 6:
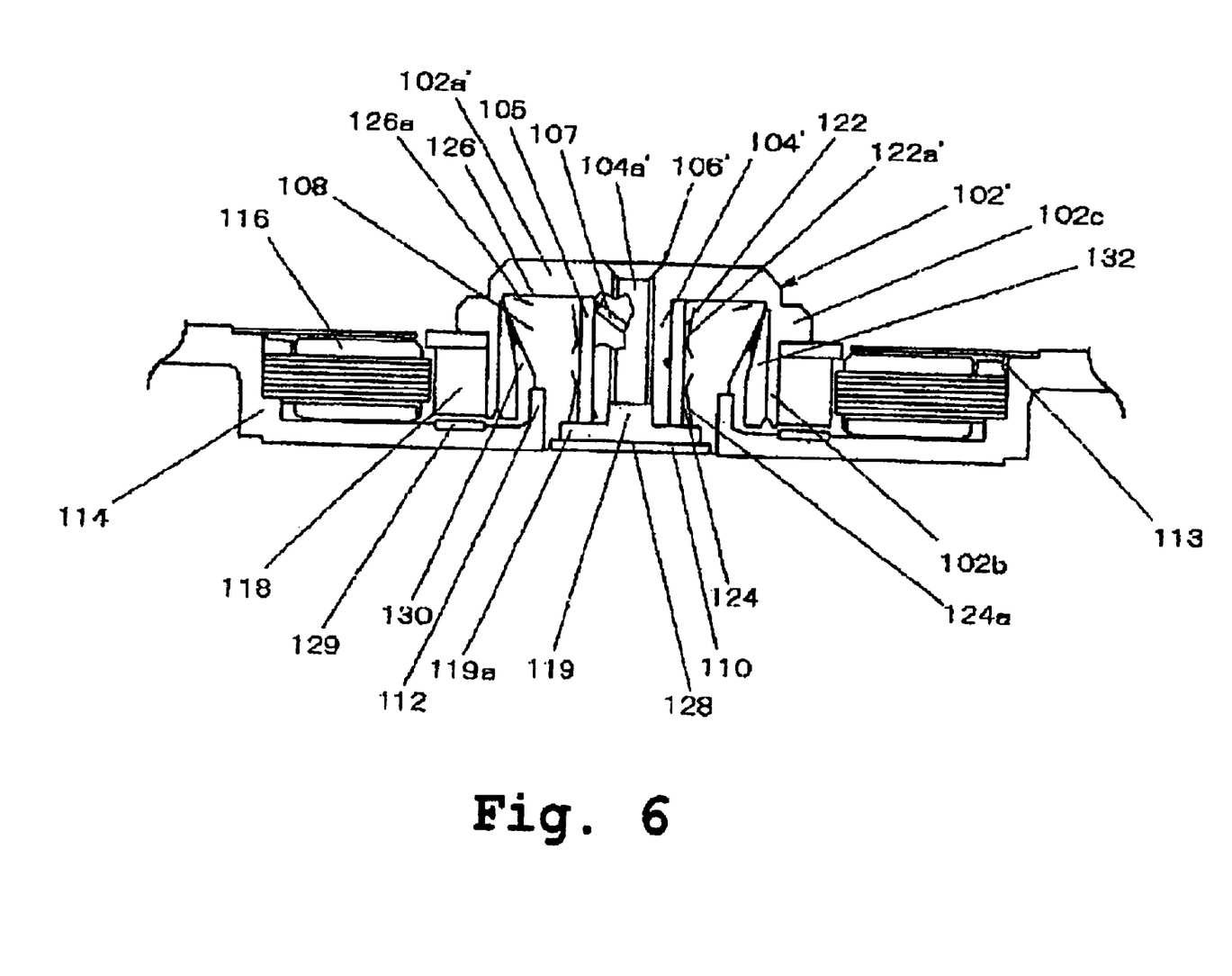
FIG. 6 is a section view diagramming the configurational outline of a spindle motor having to do with a third embodiment of the present invention.

The spindle motor illustrated in FIG. 6 may be suitably applied to cases in which dimensional restrictions on the motor in its height direction are more severe, such as in spindle motors for disk drives that for example handle PCMCIA (Personal Computer Memory Card International Association) standards. In particular, since securing bearing dimension in the motor height direction will be necessary if desired motor performance is to be provided for, further slimming of the motor has to be realized by making the bulk thickness of parts such as the rotor hub thinner. If, however, the rotor hub were made thinner-walled in order to make the spindle motor lower-profile, the surface area of its contact with the shaft would be decreased, which would leave the clinching strength insufficient. The concern then would be that the shaft might topple (tilt) or come loose, which would spoil the motor reliability. Consequently, if a spindle motor is to be low-profile, forming the shaft and rotor integrally from an identical component material is desirable. Nevertheless, forming the shaft and the rotor integrally degrades the precision with which the shaft outer circumferential surface where the radial bearing sections are constituted is superficially processed.

In order to remedy this, in the spindle motor in FIG. 6, the rotor 106 is configured by forming a shaft 104' integrally with the central part of an upper wall portion 102a' of a rotor hub 102', and by a cylindrical outer-tube member 105 fitted over the outer circumferential surface of the shaft 104'. In particular, the fact that the rotor hub 102' and the shaft 104' are formed integrally resolves the problems that give rise to insufficient clinching strength in, and defective assembly of, the rotor hub and shaft; and the radial bearing sections 122 and 124 are configured in between the outer circumferential surface of this outer-tube member 105 and the inner circumferential surface of the sleeve 108—with the outer-tube member 105 fitted onto the shaft 104' lending itself to high-precision surface processing.

A communicating hole 107 is formed in between the outer circumferential surface of the shaft 104' and the inner circumferential surface of the outer-tube member 105. The communicating hole 107 is continuous between the outer circumferential surface of the shaft 104' and the inner circumferential surface of the outer-tube member 105, stretching from the axially upper end to the lower end, and communicates the axially upper edge of the upper radial bearing section 122 (edge alongside the thrust bearing section 126) with the axially lower edge of the lower radial bearing section 124 (edge alongside the pin member 119). Here, the communicating hole 107, in the manner that a portion thereof is depicted in FIG. 6, is formed by furnishing a helical groove in the outer circumferential surface of the shaft 104', and fitting the outer-tube member 105 over the outer circumferential surface of the shaft 104'. Furthermore, oil is retained within the communicating hole 107 continuously with the oil in the bearing sections; moreover, the internal pressure of the oil retained within the communicating hole 107 balances with the internal pressure of the oil retained in each bearing section. Explanation of how the communicating hole 107 operates and functions will be omitted, since how it does is likewise as with the communicating hole 109 in the spindle motor of the second embodiment already set forth.

IV. Disk-Drive Configuration

Figure 7:
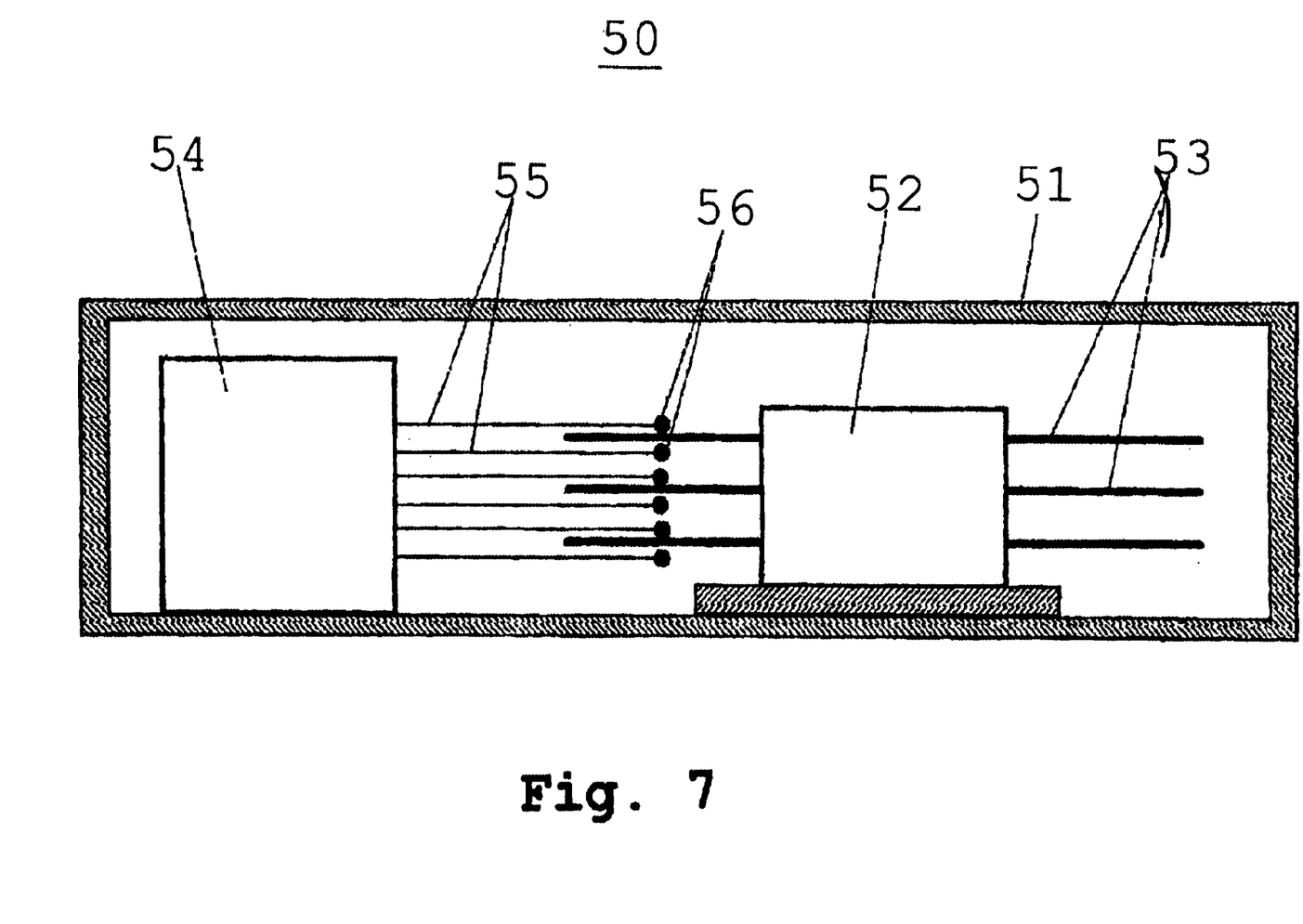
FIG. 7 is a section view schematically representing the internal configuration of a disk drive.

The internal configuration of a general disk-drive device 50 is represented in a schematic view in FIG. 7. A clean space where dust and debris are extremely slight is formed inside a housing 51, in the interior of which is installed a spindle motor 52 on which platter-shaped disks 53 for recording information are fitted. In addition, a head-shifting mechanism 57 that reads information from and writes information onto the disks 53 is disposed within the housing 51. The head-shifting mechanism 57 is constituted by: heads 56 that read/write information on the disks 53; arms 55 that support the heads 56; and an actuator 54 that shifts the heads 56 and arms 55 over the requisite locations on the disks 53.

Utilizing a spindle motor of the foregoing embodiments as the spindle motor 52 for the disk drive 50 as such enables the disk drive 50 to be made low-profile and reduced-cost, and at the same time by enabling the spindle motor to be sped higher, the motor can handle heightened-capacity disks and shortened seek times. Moreover, the fact that the spindle motors in the foregoing embodiments are structurally simplified and enable miniaturization and vertical-height reduction makes them suitable for use in disk drives 50 that drive recording disks 2.5 inches in outside diameter, and what is more, in disk drives 50 that spin recording disks 1.8 inches and under in outside diameter.

While single embodiments in accordance with the present invention of a spindle motor and a disk drive have been explained in the foregoing, the present invention is not limited to such embodiments. Various changes and modifications are possible without departing from the scope of the invention.

For example, instead of the pump-in type spiral grooves described in the embodiments set forth above, herringbone grooves having a radially asymmetrical form can be the means provided in the thrust bearing section for generating pressure acting radially inward on the oil. Should herringbone grooves radially asymmetrical in form be provided in the thrust bearing section, of pairs of spiral grooves constituting the herringbone grooves, the groove fundamentals— which are radial dimension and inclination angle with respect to the rotary direction, or groove width and depth— of the spiral grooves located on the radially outward side are configured so that the pumping force that is produced will be larger than in the spiral striations located on the radially inward side. The amount by which the pumping force of the spiral grooves located on the radially outward side is out of balance with the pumping force of the spiral grooves located on the radially inward side creates pressure imparted to and acting radially inward on the oil; and as is the case with the pumping-type spiral grooves mentioned above, the internal pressure of the oil retained in the thrust bearing section is raised.

It should be understood that if the above-noted herringbone grooves are provided in the thrust bearing section, the lifting force imparted on the rotor will be higher than the lifting force generated in spiral grooves. Consequently, a downside to the enhancement of the load-bearing force by the thrust bearing section is the concern that in combination with the lifting force generated in the hydrostatic bearing section, excess lift would be produced on the rotor. This consequently would have to be controlled by means of magnetically urging force that is imparted on the rotor.

It should also be understood that the dynamic-pressure-generating grooves provided in each of the bearing sections do not necessarily have to be furnished on the sleeve side.

What is claimed is:

1. A spindle motor comprising:

a shaft;

a sleeve formed with a through-hole fox rotary-play insertion of said shaft;

a rotor having a round top plate in the rotational center of which said shaft is constituted integrally, and a circular cylindrical wall depending from said top plate, said rotor cylindrical wall having along its inner circumferential surface an inclined face sloping so that the inner diameter of said wall contracts with further separation from said rotor top plate;

a radial bearing section configured by an oil-retaining micro-gap being formed in between an inner circumferential surface of said sleeve and an outer circumferential surface of said shaft, and by dynamic-pressure-generating grooves being provided for inducing, in response to said rotor spinning, fluid dynamic pressure in the oil retained in the micro-gap;

a thrust bearing section configured by an oil-retaining micro-gap being formed in between an upper-end face of said sleeve and a bottom face of said top plate, and by dynamic-pressure-generating grooves being provided for inducing, in response to said rotor spinning, fluid dynamic pressure in the oil retained in the micro-gap; and a taper-seal area formed sloping from radially outward heading inward with respect to the rotational center axis, in between said inner circumferential surface of said rotor cylindrical wall and an outer circumferential surface of said sleeve, in a gap whose inter-surface dimension gradually flares with further separation from said rotor top plate, wherein a boundary surface of the oil forms within said taper-seal area.

2. A spindle motor as act forth in claim 1, further comprising:

an inclined face formed on the outer circumferential surface of said sleeve, said inclined face sloping such that the sleeve outer diameter contracts with further separation from said rotor top plate; and a circular ring member affixed to the inner circumferential surface of said rotor cylindrical wall to constitute said inclined face differing from that of said inclined face along said sleeve; wherein said taper-seal area forms in between said sleeve inclined face and said ring member inclined face.

3. A spindle motor as set forth in claim 1, further comprising an annular air retainer formed in between the inner circumferential surface of said sleeve and the outer circumferential of said shaft for communicating with external air, and wherein:

said radial bearing section is twin constituents respectively adjoining said air retainer along either side axially, boundary surfaces of the oil retained in the twin radial bearing constituents forming at either axial edge of said air retainer;

the oil is retained continuously without interruption in between said thrust bearing section and a one radial bearing constituent, of the twin radial bearing constituents, being located alongside said rotor top plate;

said dynamic-pressure-generating grooves in said thrust bearing section are in pump-in form, for inducing dynamic pressure acting radially inwardly on the oil; and said dynamic-pressure-generating grooves in said radial bearing constituent located alongside said rotor top plate are devised to induce dynamic pressure acting thrust-bearing-section-ward on the oil.

4. A spindle motor as set forth in claim 1, further comprising a cover member for closing off one end of said through-hole formed in said sleeve; wherein:

an oil-retaining micro-gap is formed in between an inner face of said cover member and an adjacent end face of said shaft;

the micro-gap formed in said thrust bearing section, the micro-gap formed in said radial bearing section, and the micro-gap formed in between the inner face of said cover member and the end face of said shaft are formed in continuity;

oil is retained without interruption within the continuous series of micro-gaps throughout their entirety, reaching to said taper-seal area;

said dynamic-pressure-generating grooves in said thrust bearing section are in pump-in form, for inducing dynamic pressure acting radially inwardly on the oil;

herringbone grooves being linked pairs of spiral grooves that generate substantially equal pressure are provided as said dynamic-pressure-generating grooves in said radial bearing section; and in between the inner face of said cover member and the end face of said shaft a bearing section having pressure that is substantially in balance with the radially-inward-heading pressure generated by said thrust bearing section is formed.

5. A spindle motor as set forth in claim 4, wherein a communicating hole is formed in said sleeve, one end of said communicating hole ranging through said sleeve radially inward of said thrust bearing section, and the other end of said communicating hole ranging through an axially lower-end part of said sleeve through-hole; whereby the oil retained in the continuous series of micro-gaps can circulate either way through the communicating hole, equalizing its internal pressure.

6. A spindle motor as set forth in claim 4, further comprising a hollow, round-cylindrical outer-tube member fitted over the outer circumferential of said shaft, wherein:

said shaft and said rotor are formed from an identical component material;

said radial bearing section is configured in between an outer circumferential surface of said outer-tube member and the inner circumferential of said sleeve;

a helical communicating hole is formed in between an inner circumferential surface of said outer-tube member and the outer circumferential surface of said shaft, the communicating bole being continuous between said shaft outer circumferential surface and said outer-tube member inner circumferential surface, stretching from their upper end to their lower end axially, and communicating upper and lower edges axially of the micro-gap formed in between said sleeve inner circumferential surface and said outer-tube member outer circumferential surface; whereby the oil retained in the continuous series of micro-gaps can circulate either way through the through-bole, equalizing its internal pressure.

7. A spindle motor as set forth in claim 1, wherein said rotor is urged by magnetic force acting axially opposite-wise to the direction in which the dynamic pressure generated in said thrust bearing section acts.

8. A spindle motor as set forth in claim 4, further comprising a disk-shaped plate projecting radially outward from the outer circumferential surface of said shaft, fitted over the end of said shaft on its cover-member side; wherein a stepped section is provided in said sleeve through-hole, radially outwardly hollowing out an inner circumferential surface corresponding to said plate; and engagement of said plate into said stepped section configures a retainer for said rotor.

9. A disk drive for driving recording disks on which data may be recorded, comprising: a housing; a spindle motor for spinning the recording disks and fixed inside said housing; and a data access means for reading/writing data on the recording disks; wherein said spindle motor is the spindle motor according to claim 1.

10. A spindle motor, comprising:

a shaft;

a sleeve formed with a through-hole for rotary-play insertion of said shaft;

a rotor having a round top plate in the rotational center of which said shaft is constituted integrally, and a circular cylindrical wall depending from said top plate;

a radial bearing section configured by an oil-retaining micro-gap being formed in between an inner circumferential surface of said sleeve and an outer circumferential surface of said shaft, and by dynamic-pressure-generating grooves being provided for inducing, in response to said rotor spinning, fluid dynamic pressure in the oil retained in the micro-gap;

a thrust bearing section configured by an oil-retaining micro-gap being formed in between an upper-end face of said sleeve and a bottom face of said top plate, and by dynamic-pressure-generating grooves being provided for inducing, in response to said rotor spinning, fluid dynamic pressure in the oil retained in the micro-gap;

an inclined face formed on the outer circumferential surface of said sleeve, said inclined face inclined at an angle of approximately 20° to 35° with respect to the rotational center axis and sloping such that the sleeve outer diameter contracts with further separation from said rotor top plate;

and a circular ring member affixed to the inner circumferential surface of said rotor cylindrical wall, the ring member inner circumferential surface having an inclined face inclined at an angle of approximately 15° to 30° with respect to the rotational center axis and sloping such that the ring-member inner diameter contracts with further separation from said rotor top plate and at an angle differing from that of said inclined face along said sleeve; wherein a taper-seal area forms in between said sleeve inclined face and said ring member inclined face, in a gap whose inter-surface dimension gradually flares, with further separation from said rotor top plate, in an angle of approximately 2° to 15°.

11. A spindle motor as set forth in claim 10, further comprising an annular air retainer formed in between the inner circumferential surface of said sleeve and the outer circumferential of said shaft for communicating with external air, and wherein:

said radial bearing section is twin constituents respectively adjoining said air retainer along either side axially, boundary surfaces of the oil retained in the twin radial beating constituents forming at either axial edge of said air retainer;

the oil is retained continuously without interruption in between said thrust bearing section and a one radial beating constituent, of the twin radial bearing constituents, being located alongside said rotor top plate;

said dynamic-pressure-generating grooves in said thrust bearing section are in pump-in form, for inducing dynamic pressure acting radially inwardly on the oil; and said dynamic-pressure-generating grooves in said radial bearing constituent located alongside said rotor top plate are devised to induce dynamic pressure acting thrust-bearing-section-ward on the oil.

12. A spindle motor as set forth in claim 10, further comprising a cover member for closing off one end of said through-hole formed in said sleeve; wherein:

an oil-retaining micro-gap is formed in between an inner face of said cover member and an adjacent end face of said shaft;

the micro-gap formed in said thrust bearing section, the micro-gap formed in said radial bearing section, and the micro-gap formed in between the inner face of said cover member and the end face of said shaft are formed in continuity;

oil is retained without interruption within the continuous series of micro-gaps throughout their entirety, reaching to said taper-seal area;

said dynamic-pressure-generating grooves in said thrust bearing section are in pump-in form, for inducing dynamic pressure acting radially inwardly on the oil;

herringbone grooves being linked pairs of spiral grooves that generate substantially equal pressure are provided as said dynamic-pressure-generating grooves in said radial bearing section; and in between the inner face of said cover member and the end face of said shaft a beaming section having pressure that is substantially in balance with the radially-inward-heading pressure generated by said thrust bearing section is formed.

13. A spindle motor as set forth in claim 12, wherein a communicating hole is formed in said sleeve, one end of said communicating hole ranging through said sleeve radially inward of said thrust bearing section, and the other end of said communicating hole ranging images through an axially lower-end part of said sleeve through-hole; whereby the oil retained in the continuous series of micro-gaps can circulate either way through the communicating hole, equalizing its internal pressure.

14. A spindle motor as set forth in claim 12, further comprising a hollow, round-cylindrical outer-tube member fitted over the outer circumferential of said shaft, wherein:

said shaft and said rotor are formed from an identical component material;

said radial bearing section is configured in between an outer circumferential surface of said outer-tube member and the inner circumferential of said sleeve;

a helical communicating hole is formed in between an inner circumferential surface of said outer-tube member and the outer circumferential surface of said shaft, the communicating hole being continuous between said shaft outer circumferential surface and said outer-tube member inner circumferential surface, stretching from their upper end to their lower end axially, and communicating upper and lower edges axially of the micro-gap formed in between said sleeve inner circumferential surface and said outer-tube member outer circumferential surface; whereby the oil retained in the continuous series of micro-gaps can circulate either way through the through-hole, equalizing its internal pressure.

15. A spindle motor as set forth in claim 10, wherein said rotor is urged by magnetic force acting axially opposite-wise to the direction in which the dynamic pressure generated in said thrust bearing section acts.

16. A spindle motor as set forth in claim 10, further comprising a disk-shaped plate projecting radially outward from the outer circumferential surface of said shaft, fitted over the end of said shaft on its cover-member side; wherein a stepped section is provided in said sleeve through-hole, radially outwardly hollowing out an inner circumferential surface corresponding to said plate; and engagement of said plate into said stepped section configures a retainer for said rotor.

17. A disk drive for driving recording disks on which information may be recorded, comprising: a housing; a spindle motor for spinning the recording disks and fixed inside said housing; and a data access means for reading/writing data on the recording disks; wherein said spindle motor is the spindle motor according to claim 10.

* * * * *